United States Patent Office 2,822,279

Patented Feb. 4, 1958

2,822,279

VITRIFIABLE FLUX AND SILVER COMPOSITIONS CONTAINING SAME

William R. Larsen, Fords, and Oliver A. Short, Metuchen, N. J., assignors to E. I. du Pont de Nemours and Company, Wilmington, Del., a corporation of Delaware No Drawing. Application August 6, 1954
Serial No. 448,375

2 Claims. (Cl. 106—48)

This invention relates to a new and improved vitrifiable flux and to an improved silver composition for the production of fired-on, electrically conductive silver coatings on ceramic objects.

Silver compositions comprising finely divided particles of silver and a vitrifiable flux disposed in a liquid vehicle have been used in preparing fired-on silver coatings on ceramic objects. Compositions which contain a bismuth oxide-lead borosilicate flux and yield fired-on silver coatings that are wetted by solder without first burnishing or copperplating the same are described in Knox U. S. Patent 2,385,580. Because they give directly solderable silver coatings, particularly on high dielectric constant titanate bodies as well as other ceramic materials, the compositions of the patent have found wide use. However, the solder wettability and the electrical properties of the resulting silver coatings are not as satisfactory as desired on low dielectric constant bodies.

The term "ceramic" as used herein is meant to include glasses such as the lime-silicate, borosilicate and metal-borosilicate glasses and also colored and optical glasses; china porcelain and other vitrifiable clays and the like; and vitreous dielectric materials such as mica, steatite porcelain, titanates such as barium titanate, and titanium dioxide bodies, and the like.

Throughout the specification and claims all parts, proportions and percentages are by weight, unless stated to be otherwise.

It is an object of the invention to provide a new and improved vitrifiable flux. Another object is to provide an improved silver composition containing an improved flux, which composition yields adherent directly solderable fired-on silver coatings having improved electrical properties on either low or high dielectric constant bodies. Still other objects will be apparent from the following description.

The present improved vitrifiable flux comprises bismuth trioxide and an alkali metal-cadmium borate composition. The present improved silver composition comprises a dispersion of finely divided particles of silver and finely divided particles of the above flux in a vehicle.

The improved flux will generally comprise (A) 50 to 95% bismuth trioxide ($Bi_2O_3$) and (B) 5 to 50% of an alkali metal-cadmium borate composition containing 1% to 18% alkali metal oxide, 50 to 95% CdO, 5 to 50% $B_2O_3$ and 0 to 20% $SiO_2$. The above percentage ranges for flux components (A) and (B) and for the oxide constituents of (B) are recommended since, if they are not met, silver coatings will generally be obtained which are deficient in one or more electrical properties, in adherence, or in solder wettability. However, components (A) and (B) may contain materials other than those stated. Thus, they may contain minor amounts of ZnO, CaO, BaO, MgO, $TiO_2$, $ZrO_2$, $Al_2O_3$ or $Sb_2O_3$, but the total amounts of (A) plus (B) generally should be at least 75% of the total weight of the flux.

The preferred flux will comprise (A) 60 to 90% $Bi_2O_3$ and (B) 10 to 40% of an alkali metal-cadmium borosilicate composition containing 5 to 10% alkali metal oxide, 55 to 80% CdO, 10 to 25% $B_2O_3$ and 5 to 15% $SiO_2$, with components (A) and (B) together equal to at least 75%, and preferably at least 90% of the total weight of the flux.

Component (A) of the flux can be bismuth trioxide ($Bi_2O_3$) or any compound such as bismuth subnitrate which yields bismuth trioxide under firing conditions.

Component (B) of the flux may be present in the form of a glass frit prepared by fusing together the desired proportions of an alkali metal oxide, or a compound such as the alkali metal carbonates which yields an alkali metal oxide at the fusion temperature; cadmium oxide, or a compound such as cadmium carbonate which yields cadmium oxide at the fusion temperature; and boric acid, boric oxide or an equivalent boron compound; with or without $SiO_2$ or an equivalent silicon compound. The melt is fritted by pouring it into water and the resulting frit is dried and ground in a ball mill to a finely divided powder. Obviously, a single compound can be used to supply part or all of the requirements of more than one of the oxide constituents of the frit. Thus, alkali metal borates such as borax can be used as the source of all or part of the alkali metal oxide and boric oxide requirements; similarly, alkali metal silicates can be used to supply all or part of the requirements for $SiO_2$ and the alkali metal oxide. Component (B) may also be a physical blend of the appropriate oxides, carbonates, borates or silicates.

The alkali metal oxide constituent of component (B) of the flux can be the oxide of any of the alkali metals, or mixtures of such oxides. Preferably, it is sodium oxide ($Na_2O$) since fluxes containing this oxide usually give better adherence of the fired-on silver coatings to ceramic objects than do fluxes containing $K_2O$, and they give silver coatings having a lower power factor than do fluxes containing $Li_2O$.

The final flux composition is prepared by thoroughly mixing the desired proportions of components (A) and (B), both in finely divided form, for example, 20 mesh (i. e. 20 meshes per linear inch) or finer. The resulting mixture can be used as such in preparing the silver composition, or it can first be sintered, ball-milled in water to a finely divided form, dried and then used.

The silver composition will usually be prepared by dispersing in a liquid vehicle about 3 to 20, preferably 4 to 10, parts of finely divided particles of silver for each part of flux. The silver particles should be sufficiently finely divided to pass through a screen of 20 mesh size or finer. The particle size of the silver preferably will be at least as fine as about 200 to 325 mesh. The amount of liquid vehicle in the silver composition is not critical and may vary considerably depending upon whether a paste or liquid composition is desired.

The silver particles may be in the form either of metallic silver (preferred) or of a silver compound, such as the oxide or carbonate, which will be converted to metallic silver during firing at the temperature employed. When not specifically directed to metallic silver, the terms "silver," "silver particles" or "finely divided silver" as used herein with reference to the silver composition before it is fired are meant to include, besides metallic silver, silver in any form which will be converted to metallic silver during firing.

Any liquid vehicle which functions to hold the silver and flux particles together and in good admixture and will not prevent the production of metallic silver during the firing operation can be used in preparing the silver composition. Many suitable vehicles are known, such as those disclosed in the above Knox patent. In many instances, the vehicle used will contain a volatile organic solvent so that the resulting silver composition will be of the well-known air-drying type. Vehicles which are of the thermo-fluid type may also be used in practicing the present invention to give silver compositions which are solid at normal application temperatures but which become fluid when heated to somewhat higher temperatures. Thermo-fluid compositions are applied at a temperature at which they are fluid or pasty while the object to which they are applied is at a lower temperature at which the composition rapidly forms a firm adherent coating.

The silver composition can be applied to the ceramic object by any desired method, for example, by brushing, spraying, dipping or screen stenciling, following which the object is dried if necessary and fired in customary manner to fuse firmly the silver-flux composition to the ceramic object. The fused flux functions as a vitreous matrix for the metallic silver particles and binds them to the surface of the ceramic object.

The copending application of Oliver A. Short, S. N. 448,374, filed of even date herewith, describes certain cadmium borate compositions which are advantageous replacements for the lead borosilicate compositions of the type described in Knox U. S. Patent 2,385,580, in fluxes for silver compositions. The present alkali metal-cadmium borate compositions are distinct improvements over the cadmium borate compositions of the above application in that silver compositions containing them yield fired-on silver coatings which are more adherent on low dielectric constant bodies. Furthermore, electric capacitors prepared from the present silver compositions have higher capacitances than do capacitors prepared using silver compositions which contain a cadmium borate.

Melts of the present alkali metal-cadmium borate compositions are much less corrosive to refractory crucibles than are melts of the cadmium borate compositions of the above application. This is an obvious advantage when preparing frits of such compositions.

Alkali metal compounds have heretofore been excluded from glass binders in silver compositions for preparing fired-on electrically conductive silver coatings. This is because the presence of alkali metal ions is deleterious to electric capacitors and printed circuits resulting from fired-on silver coatings from previously available silver compositions. This has been attributed to migration of the alkali metal ion which in effect constitutes an electrical leakage, for example, between capacitor plates.

Surprisingly, the presence of alkali metal oxides and particularly sodium oxide in the present fluxes is not deleterious and capacitors prepared from the present silver compositions have excellent electrical properties including unexpectedly low power factors.

The present silver compositions can be fired on ceramic objects over a wide temperature range, e. g. 1200 to 1500° F., to give fired-on coatings which are directly solderable and strongly adherent. The soldering of metal objects, e. g. electrical lead wires, to such coatings can be readily accomplished using the commonly known soft solders, e. g. one containing about equal parts of tin and lead. Solders containing a small amount of silver are preferred, e. g. one containing about 62% tin, 36% lead and 2% silver. Fluxing of the silver surface prior to soldering using any common rosin solder flux is advantageous. No burnishing or electroplating of the silver surface prior to soldering is necessary.

The invention is illustrated by the following examples:

*Example 1*

A mixture of 500 parts cadmium oxide ($CdO$), 100 parts silica ($SiO_2$) and 355 parts borax ($Na_2B_4O_7 \cdot 10H_2O$) was melted and the melt was poured into water. The approximate composition of the resulting frit after drying was 7.4% $Na_2O$, 63.4% $CdO$, 12.7% $SiO_2$ and 16.5% $B_2O_3$. The frit was milled to a fine powder (about 200 mesh) then mixed with 4 times its weight of bismuth trioxide ($Bi_2O_3$). The resulting flux or bismuth trioxide-frit mixture was dispersed together with finely divided (about 200 mesh) silver, in a vehicle comprising 7.3% ethyl cellulose, 23.0% hexaline glycol and 69.7% carbitol acetate, together with small amounts of phosphorated tall oil and diethyl oxalate. The proportions were:

| | Parts |
|---|---|
| Silver | 62.0 |
| Flux | 11.2 |
| Vehicle | 26.8 |

Capacitors prepared by screen stenciling the above silver composition onto dielectric chips 0.5 mm. thick so as to provide a circular electrode area 1.1 cm. in diameter on each side of the chip, and firing the resulting coatings at 1400° F. in the customary manner, had the following electrical properties:

| Type of Chip | Dielectric Constant (Cm.) | Capacitance (mmf.) | Power Factor (percent) |
|---|---|---|---|
| Titanium oxide | 100 | 150 | 0.04 |
| Calcium titanate | 1,250 | 5,400 | 0.65 |
| Barium titanate | 6,000 | 12,000 | 0.65 |

The fired-on silver coatings on the above chips, when fluxed with a rosin solder flux, were readily wet by solder containing 62% tin, 36% lead and 2% silver. A pull of at least 10 lbs. was required to dislodge a soldered-on lead wire when the pull was in a direction parallel to the face of the chip.

The capacitances of the above capacitors were generally 5 to 10% higher than those of similar capacitors prepared using similar silver compositions whose flux included a cadmium borosilicate or lead borosilicate composition in place of the above sodium-cadmium borosilicate. Moreover, the fired-on silver coatings were generally from 30 to 50% more adherent.

*Example 2*

A frit of the composition 10.8% $K_2O$ (derived from potassium carbonate) 61.1% $CdO$, 12.2% $SiO_2$ and 15.9% $B_2O_3$ (derived from boric acid) was prepared and used to make a silver composition as generally described in Example 1. Use of the silver composition as in that example gave capacitors with similar electrical properties but the fired-on silver coatings were somewhat less adherent.

*Example 3*

Example 2 was repeated using lithium carbonate in place of potassium carbonate to give a frit of the composition 3.7% $Li_2O$, 66.0% $CdO$, 13.2% $SiO_2$ and 17.1% $B_2O_3$. Generally similar results were obtained except that the power factors were somewhat high for the capacitors of low dielectric constant bodies.

The above examples illustrate silver compositions of a pasty consistency suitable for application to ceramic objects by the screen stencil method. If the application is to be by means of a brush, or by spraying or dipping methods somewhat less viscous compositions will generally be desired. Reduction in the viscosity can be achieved by reducing the amount of ethyl cellulose or by increasing the amount of volatile solvents, or both, in the vehicle shown in Example 1. Other types of commonly used vehicles can be employed and their choice and composition will depend largely upon the particular method chosen for applying the silver composition.

We claim:

1. A vitrifiable flux consisting essentially of 60 to 90% bismuth trioxide and 10 to 40% of an alkali metal-cadmium borate composition consisting essentially of 5 to 10% alkali metal oxide, 55 to 80% CdO, 10 to 25% $B_2O_3$ and 0 to 20% $SiO_2$, the above oxide components constituting at least 75% of said flux.

2. A silver composition comprising finely divided metallic silver and vitrifiable flux particles dispersed in a vehicle in a weight proportion of silver to flux of between 3:1 and 20:1, said flux consisting essentially of 60 to 90% bismuth trioxide and 10 to 40% of an alkali metal-cadmium borate composition consisting essentially of 5 to 10% alkali metal oxide, 55 to 80% CdO, 10 to 25% $B_2O_3$ and 0 to 20% $SiO_2$, the above oxide components constituting at least 75% of said flux.

References Cited in the file of this patent

UNITED STATES PATENTS

| | | |
|---|---|---|
| 2,312,788 | Andrews et al. | Mar. 2, 1934 |
| 2,385,580 | Knox | Sept. 25, 1945 |
| 2,457,158 | Kock | Dec. 28, 1948 |